United States Patent Office 3,401,046
Patented Sept. 10, 1968

3,401,046
METHOD OF MAKING A COMPOSITION USEFUL IN MEAT CURING
John H. Mahon, Scott Township, Allegheny County, Pa., assignor to Calgon Corporation, a corporation of Pennsylvania
No Drawing. Filed Nov. 23, 1964, Ser. No. 413,313
5 Claims. (Cl. 99—222)

ABSTRACT OF THE DISCLOSURE

A new meat curing composition is made by hydrating a hydratable phosphate with a solution of sodium nitrite or nitrate containing no more water than sufficient to fully hydrate the phosphate.

---

This invention relates to meat curing compositions and to methods of curing meat therewith in which the danger of overtreatment with conventional toxic curing compositions is greatly reduced.

It has been known for many years that conventional meat curing compounds such as alkali metal nitrites are toxic and even lethal to humans at certain ingestion levels. The hazard of misusing sodium nitrite in place of sodium chloride has caused the death of several persons when the nitrite was added to fish; also, since $NaNO_2$ tastes like NaCl, the hazard is all the more severe. Nevertheless, sodium nitrite and sodium nitrate (which yields $NaNO_2$ by chemical changes in the meat), when used as curing agents in meat such as hams, bacon, sausage, and other cured meat has been tolerated by the various government agencies having jurisdiction over meat inspection, partly because no safer curing agent has ever been proposed, and partly because regulations and inspection procedures are designed to minimize the possibility of their misuse.

In spite of generally excellent protection of the public by way of inspection and regulation against overuse of the nitrite and nitrate curing agents, there still remains the clear possibility of injury through purely accidental overuse of the agents in curing meats. The need for a method of guarding against accidental misuse has long been recognized by the industry and government.

It has been proposed to mix several of the pickle ingredients in a single container in the proper use proportions so that only one type of bag or drum will be used and thus confusion between containers of different types will be avoided. The difficulty with this method, however, is that the various ingredients exhibit a range in particle sizes and densities so that a homogeneous dry mixture is very difficult to form prior to its addition to a bag. The likelihood is great that a significant percentage of bags filled from a master mix or batch of dry compound will contain too much sodium nitrite or an undesirable proportion of one or more of the other pickle ingredients, or that the particles will become segregated so that too much toxic sodium nitrite will be present in a given area of the bag.

It also has been proposed to include sodium nitrite and/or nitrate as a relatively minor ingredient of a large volume of sodium chloride to be used in a pickle. See Lloyd A. Hall U.S. Patent 2,145,417, for example. In order to avoid particulate separation, this dry mixture has been dissolved and recrystallized to form crystals containing both of these ingredients in more or less uniform proportion. This process is quite costly and therefore commercially unattractive.

My invention greatly minimizes the chances of error in pickle preparation by combining at least two of the common pickle ingredients into a single composition. The combination is completely homogeneous, free-flowing, and thus will be of uniform composition throughout each container. It is a combination of fully substituted alkali metal phosphate and sodium nitrite and/or nitrate, with or without additional ingredients, made by hydrating or partially hydrating the phosphate in the presence of the curing agent and other ingredients. The curing agent is preferably in solution but may also be employed as a slurry.

My invention includes a new composition of matter made by mixing anhydrous sodium tripolyphosphate and a solution of sodium nitrite, as a curing agent, in a quantity of water sufficient to become bound to the sodium tripolyphosphate as water of hydration or "water of crystallization." As the water is taken up by the sodium tripolyphosphate to form its hydrate, the sodium nitrite crystallizes on its surface to form a homogeneous mass which is physically inseparable from the tripolyphosphate. The hydration reaction is exothermic and, if carried out under some agitation, preferably with a flow of air for cooling the product, results in a granular, free-flowing product of uniform chemical composition.

My invention contemplates sufficient water in the curing agent solution or slurry of curing agent to achieve at least partial hydration of the phosphate, and preferably no more than about 120% by weight of the water necessary for full hydration. More precisely, the maximum amount of water which will produce a dry product is that amount required to complete hydration of the phosphate and cool the product by evaporation to ambient temperature. In the case of sodium tripolyphosphate, I prefer at least sufficient water to form the tetrahydrate in the entire quantity of phosphate but no more than about 120% of the water necessary to form the hexahydrate for the entire quantity. Excess water is evaporated during the exothermic reaction and in the subsequent cooling of the product. The minimum amount of water which is of practical use in my invention is 25 mole percent of the phosphate, e.g. enough to add an average of one-quarter mole of water for each mole of phosphate. The phosphate of course should be in a condition capable of hydration at least to this extent.

Hydration reactions of various types are known. For example, see U.S. Patent 2,351,559 and U.S. Patent 2,746,930. In the former patent, anhydrous tetrasodium pyrophosphate was added to a concentrated slurry of alkali metal carbonate to absorb some or all of the moisture present in the mixture. In the latter patent, a process is described in which anhydrous sodium tripolyphosphate is used to absorb moisture in an aqueous medium containing an oil detergent to increase the "retentivity" of the tripolyphosphate for the detergent.

My invention utilizes a hydration reaction to achieve a dry solid mixture wherein the sodium nitrite and/or sodium nitrate is completely recrystallized preferably from a uniform dispersion thereof, i.e. a solution, to develop an essentially new composition of matter of novel physical form. The composition comprises physically joined crystals of sodium tripolyphosphate and sodium nitrite and/or sodium nitrate in uniform proportions.

My invention also makes practical the addition of certified food coloring agents to the nitrite and/or nitrate and phosphate composition. Preferably the food coloring is added only in amounts sufficient to obtain a distinct coloring of the resulting curing compound for safety reasons and not in quantities to color the meat artificially, although there is no technical reason why larger amounts may not be added for this purpose. The purpose of the food coloring is to yield a color which is easily distinguishable from the color of other ingredients used to prepare the pickle. This purpose is well served by light shades of coloration achieved by very small quantities of coloring material. To obtain excellent uniformity of distribution of the coloring agent, it may be added, for example, to the original solution of curing agent prior to adding it to the polyphosphate, although it is preferably dispersed in dry form in the dry phosphate. A few coloring agents presently certified as safe are FD&C red #3, FD&C yellow #5, FD&C blue #2, and FD&C green #1. These are preferred because of their stability, their certification as harmless, and their commercial availability. They are stable and virtually inert in the presence of all ingredients of my invention in quantities and proportions of practical utility. Other colors may also be used. Any coloring agent is contemplated in my invention if it is safe to use and stable in the presence of the cure ingredients.

I may also add to the nitrite and/or nitrate solution prior to the phosphate hydration reaction small quantities of other pickle or curing ingredients such as flavoring agents, spices, and the like, or sodium glutamate, sodium inosinate, which is added for the purpose of enhancing the flavor and palatability of the cured meat, sodium ascorbate and sodium isoascorbate (also known as sodium erythorbate), which have the ability to hasten the curing operation. In each case, the quantity of solvent water which is to become the phosphate's water of hydration must be sufficient to perform this function in order to achieve the maximum homogeneity of product and the most efficient manufacturing conditions.

It has been observed that a straight admixture of sodium tripolyphosphate and a solution of sodium nitrite in certain proportions has a tendency to emit an "odor of nitrite" or nitric oxide. The tendency toward instability, or the tendency to emit an odor of nitric oxide, may be overcome by an alkaline pH adjustment. Most convenient is the addition of a very minor amount of sodium hydroxide to the curing agent solution prior to addition to the phosphate. I may add up to about 6 mole percent, based on the alkali metal tripolyphosphate, of NaOH or any other strongly alkaline compound. About 5 mole percent NaOH is sufficient to inhibit the formation of nitrite odor in the presence of any practical amount of sodium nitrite within the ranges contemplated in my invention. In other words, the formation of the nitrite odor appears to be controlled by treating the tripolyphosphate with the proper quantity of alkali. Other equivalent alkaline salts which do not react with nitrites and which are suitable for use in my invention are potassium hydroxide, sodium carbonate, potassium carbonate, and ammonium hydroxide. In each case, 5 or 6 mole percent of the alkaline compound based on the phosphate is satisfactory.

Although up to this point I have spoken of only sodium tripolyphosphate as an example of the phosphates useful in my invention, it is not restricted to curing agent combinations with any particular phosphate compound. A phosphate composition consisting essentially of sodium tripolyphosphate is presently preferred because it can assume a hexahydrate form and also because of its present widespread use in the meat curing industry. See U.S. Patent 2,513,094. I may use any fully substituted alkali metal phosphate having an analytical molar ratio of $M_2O$ to $P_2O_5$ of about 1.67:1 to about 3:1 where M is an alkali metal, which is in a condition capable of further hydration to the extent of at least one-quarter mole of water, or mixtures of such phosphates. Among the alkali metal hydrate-forming phosphates are tetrasodium and tetrapotassium pyrophosphate, and trisodium and tripotassium orthophosphate. The literature contains no mention of a hydrate of alkali metal metaphosphate, or of any alkali metal phosphate having a ratio of alkali metal oxide to $P_2O_5$ less than that of the tripolyphosphate, ie., 1.67:1. Thus, when I speak of "hydratable alkali metal phosphate," the term is intended to exclude the metaphosphates and other phosphates which are incapable of forming hydrates. The term "hydratable fully substituted alkali metal phosphate" thus would include all hydrate-forming tripolyphosphates, pyrophosphates, and orthophosphates, and any others having analytical ratios of $M_2O$ to $P_2O_5$ of 1.67:1 to 3.0:1, where M is an alkali metal, in a form hydratable at least to the extent of one-quarter mole of water. Hydration of anhydrous $Na_3PO_4$, $K_4P_2O_7$, $Na_4P_2O_7$, $K_5P_3O_{10}$, and $K_3PO_4$ has been accomplished in the manner of the above examples using 100 grams of phosphate and 5 grams of sodium nitrite dissolved in respectively 3, 2, 3, 2, and 2 moles of water. Good products were obtained in each case. Unsatisfactory products were obtained in attempts to make in the same manner products containing disodium orthophosphate tetrahydrate and the trihydrate of $Na_2H_2P_2O_7$.

Trisodium orthophosphate forms several hydrates up to 12 moles of water, tetrasodium pyrophosphate is known to form a decahydrate, and tetrapotassium pyrophosphate forms a trihydrate. In general, it may be said that any hydratable fully substituted alkali metal phosphate analytically having molar ratio of $M_2O$ to $P_2O_5$ of about 1.67:1 to about 3:1 where M is alkali metal or mixtures of such phosphates, may be combined with a curing agent having the formula $MNO_n$ where $n$ is two or three and M is sodium or potassium in the presence of water sufficient to hydrate the hydratable phosphate at least to the extent of one-quarter mole of water per mole of phosphate.

Virtually any ratio of curing agent to phosphate is contemplated in the scope of my compositions although the practical limits for curing use may be considered to be about 1:3 to about 1:50. Water should preferably be present as the solvent for the nitrite or nitrate in quantities sufficient to dissolve all the curing agent but not significantly more than sufficient to hydrate the phosphate. The preferred ratio of ingredients is about 1:15 to about 1:35 of curing agent to phosphate.

Thus, it will be seen that my invention includes a process of making a composition useful in meat curing consisting essentially of mixing one part by weight sodium nitrite with about three to about fifty parts by weight alkali metal phosphate analytically having a molar ratio of alkali metal oxide to $P_2O_5$ of about 1.67:1 to 3:1, which phosphate is capable of accepting at least one-quarter mole additional water of crystallization, in the presence of at least one-quarter mole water per mole of the phosphate, and at most an amount of water sufficient to fully hydrate said phosphate and cool the resulting product by evaporation, and also in the presence of up to about 6 mole percent, based on the phosphate, of an alkaline pH-adjusting agent.

The following examples will illustrate some of the variations of my invention.

EXAMPLE I

On the assumption that a pickle would be desirable which contained polyphosphate and sodium nitrite in the same proportions as their respective legal limits for inclusion in meat, the two ingredients were weighed out, in proportions which, if used at full strength in the pickle, would achieve the legal limit but which, of course, could also be used at lesser strengths and different proportions to achieve a pickle containing proportionately less than the legal limit of each ingredient.

A solution of 5 g. $NaNO_2$ was prepared in 30 ml. of water. The solution was added slowly with agitation to 100 g. anhydrous granulated pentasodium tripolyphosphate. The result of the exothermic hydrating reaction which was completed in a few minutes was a dry, free-flowing, granulated product. The product was separated mechanically into coarse and fine particles and these were analyzed for $P_2O_5$ and $NaNO_2$ content. The theoretical content in a homogeneous mixture was calculated to be 42.8% $P_2O_5$ by weight and 3.85% $NaNO_2$ by weight. The coarse particles were found to contain 42.3% $P_2O_5$ and 3.78% $NaNO_2$, while the fine particles contained 42.5% $P_2O_5$ and 3.69% $NaNO_2$.

It is apparent that separation through handling or otherwise of the fine particles from the coarse ones would result in negligible change in the ratio of one constituent to the other.

The amount of water used in this example is the amount required to achieve the hexahydrate form of the sodium tripolyphosphate from the completely anhydrous form. The hexahydrate is a stable hydrate. Lesser degrees of crystallization or hydration and the molecular water the scope of my invention as stated elsewhere. It will be apparent to those skilled in the art that there is no necessity for starting with a phosphate which is absolutely anhydrous. One may begin with a quantity of sodium tripolyphosphate, for example, which contains an amount of water of hydration which corresponds to a trihydrate. In this case, it would be desirable, but not essential, to use enough water to convert all the tripolyphosphate to the hexahydrate form.

In this connection it may be mentioned that the water of crystallization or hydration and the molecular which characterizes the phosphates are not the same. The "molecular" water also popularly known as "water of constitution" is the basis for the distinction between the orthophosphates and the various "molecularly dehydrated phosphates." The orthophosphates are salts of orthophosphoric acid, which has a ratio of $H_2O/P_2O_5$ of 3:1. The pyrophosphates, tripolyphosphates, and metaphosphates respectively are salts of acids having, $H_2O/P_2O_5$ ratios of 2:1, 1.67:1, and 1:1.

EXAMPLE II

The same procedure was followed as in Example I except that 0.01 g. of a food coloring known as B–3012 Lakolene FD&C red #3 (Kohnstamn) was mixed with the sodium tripolyphosphate before addition of the sodium nitrite solution. The resulting dry, free-flowing, intimate mixture had a pink color which was homogeneously distributed. Inclusion of the composition as part of a typical pickle composition imparted to it a faint pink color easily distinguishable from pickle not containing the coloration but not enough color to change the color of the cured meat product.

EXAMPLE III

The procedures of Examples I and II had resulted in excellent and useful dry product compositions but after a period of time an "odor of nitrite" was detected in them. This was taken as an indication of instability. It was corrected by preparing a composition as in Example I but with the addition of NaOH to the sodium nitrite solution in an amount equivalent to about 0.05 mole NaOH per mole of $Na_5P_3O_{10}$. The resulting dry, free-flowing, product did not develop the "nitrite odor." The odor was not detectable after six months storage and the nitrite content was stable.

EXAMPLE IV

In this demonstration, the same weight ratio of $Na_5P_3O_{10}/NaNO_2/NaOH$ was used as in Example III except that only enough water was used to yield the tetrahydrate of the tripolyphosphate. A solution of 5.0 g. of $NaNO_2$ and 0.544 g. NaOH in 19.6 ml. of water was added to 100 g. of anhydrous granular pentasodium tripolyphosphate under agitation. The resulting product was a dry, free-flowing, granular product of uniform composition.

EXAMPLE V

A nearly saturated solution of sodium nitrite was prepared by dissolving 25 g. $NaNO_2$ in 30 ml. of water. After addition to 100 g. anhydrous granular pentasodium tripolyphosphate, the hydration reaction proceeded somewhat slowly but eventually became dry with some caking and balling. Hard large masses were ground. Examination and analyses confirmed that the phosphate and $NaNO_2$ were evenly distributed throughout the batch. The composition is fully soluble and homogeneous; however, it is not expected that this more or less extreme ratio of ingredients will come to widespread use since if this composition were to be used at a concentration providing the legal limit of $NaNO_2$ in the cured meat, the level of phosphate in the meat would be far below the optimum quantity.

EXAMPLE VI

A composition was made using potassium nitrate as well as sodium nitrite. In this preparation, 5 g. $NaNO_2$ and 5 g. $KNO_3$ were dissolved in 30 ml. of water, which was added to 100 g. anhydrous granulated pentasodium tripolyphosphate. The dry, free-flowing, granules which resulted were homogeneous and immediately soluble.

EXAMPLE VII

A curing pickle was prepared containing 6¼ pounds of the composition prepared according to Example IV, 36 lbs. salt and 25 gallons water. The pickle was injected into a group of hams by artery pumping at about 20% and cured in the usual manner in a commercial smokehouse. An excellent, even cure color was obtained.

EXAMPLE VIII

The composition of Example IV was used in the preparation of a group of sausages in a commercial meat packing plant. An excellent even cure with good color development was obtained. Samples of the sausage analyzed as follows. 11.1% protein, 50.6% moisture, 31.3% fat, 2.7% salt, and 0.48% phosphate as $P_2O_5$ of which about half was added phosphate, 125 p.p.m. nitrite.

EXAMPLE IX

In this experiment, 100 g. anhydrous sodium tripolyphosphate was hydrated with a solution consisting of 5.0 g. $NaNO_2$, 13.6 ml. of N/l. NaOH, 6.0 ml. $H_2O$, and 0.01 g. Lakolene red #3, a dry, uniformly colored product was produced evincing no odor of nitrite.

It will be evident to those skilled in the art that some fully hydrated phosphate may be present in the reaction mixture; also, metaphosphate may be present. However, this practice is not preferred since phosphates which are not hydratable do not enter into the hydration reaction and therefore will not be as intimately and homogeneously dispersed in the product as those which become further hydrated.

I have described certain specific examples and preferred illustrations of my invention but it is not limited thereto. It may be otherwise practiced within the scope of the following claims.

I claim:

1. Process of making a composition useful in meat curing consisting essentially of mixing one part by weight sodium nitrite with about three to about fifty parts by weight alkali metal phosphate analytically having a molar ratio of alkali metal oxide to $P_2O_5$ of about 1.67:1 to 3:1, which phosphate is capable of accepting at least one-quarter mole additional water of crystallization, in the presence of at least one-quarter mole water per mole of the phosphate, and at most an amount of water sufficient to fully hydrate said phosphate and cool the resulting product by evaporation and also in the presence of up to about 6 mole percent, based on the phosphate, of an alkaline pH-adjusting agent.

2. Process of claim 1 in which the phosphate consists essentially of pentasodium tripolyphosphate.

3. Process of making a composition useful in meat curing consisting essentially of mixing together:

(a) a solution of a curing agent of the formula $MNO_n$ where $n$ is an integer from 2 to 3 and M is an alkali metal, and (b) hydratable fully substituted alkali metal phosphate analytically having a molar ratio of $M_2O$ to $P_2O_5$ of about 1.67:1 to about 3:1 where M is alkali metal, the weight ratio of sodium nitrite to phosphate being about 1:3 to about 1:50 and the amount of water in the solution being at least one-quarter mole per mole of phosphate and at most an amount of water sufficient to fully hydrate said phosphate and cool the resulting product by evaporation, whereby a dry homogeneous composition of joined crystals of sodium nitrite and phosphate is produced.

4. Process of claim 3 in which the phosphate consists essentially of pentasodium tripolyphosphate.

5. Process of claim 3 in which up to about 6 mole percent, based on the phosphate of an alkaline pH-adjusting agent, is also present.

References Cited
UNITED STATES PATENTS

| | | | |
|---|---|---|---|
| 2,513,094 | 6/1950 | Hall | 99—159 |
| 2,828,212 | 3/1958 | Sair | 99—159 X |
| 3,029,150 | 4/1962 | Bickel | 99—159 X |
| 3,104,978 | 9/1963 | Elder | 99—159 X |
| 3,192,055 | 6/1965 | Beerend et al. | 99—222 |
| 3,193,396 | 7/1965 | Sair | 99—159 X |

HYMAN LORD, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,046                 September 10, 1968

John H. Mahon

It is certified that error appears in the above identified patent and that said Letters Patent are hereby corrected as shown below:

Column 2, line 51, "oil" should read -- oily --. Column 5, line 8, cancel "crystallization or hydration and the molecular water" and insert -- hydration may be employed and are, of course, within --; line 19, after "molecular" insert -- water --.

Signed and sealed this 3rd day of February 1970.

(SEAL)
Attest:

Edward M. Fletcher, Jr.                 WILLIAM E. SCHUYLER, JR.
Attesting Officer                         Commissioner of Patents